United States Patent [19]

Campbell et al.

[11] Patent Number: 4,714,151

[45] Date of Patent: Dec. 22, 1987

[54] APPARATUS FOR SUPPORTING AND ENCLOSING CONVEYOR SYSTEMS

[75] Inventors: Colin D. Campbell, West Jordan; David R. Campbell, Salt Lake City, both of Utah

[73] Assignee: Cambelt International Corporation, Salt Lake City, Utah

[21] Appl. No.: 858,012

[22] Filed: Apr. 30, 1986

[51] Int. Cl.[4] .............................................. B65G 21/00
[52] U.S. Cl. .............................. 198/860.5; 198/860.1
[58] Field of Search ................ 198/860.5, 860.1, 860.3

[56] References Cited

U.S. PATENT DOCUMENTS

| | | | |
|---|---|---|---|
| 2,249,588 | 7/1941 | Waddle | 198/860.3 X |
| 2,644,572 | 7/1953 | Mercier | 198/860.5 |
| 2,793,738 | 5/1957 | Erickson | 198/860.1 |
| 3,306,218 | 2/1967 | Reeves | 103/72 |
| 3,561,907 | 2/1971 | Campbell | 417/53 |
| 3,592,556 | 7/1971 | Campbell | 415/1 |
| 3,878,936 | 4/1975 | Niggemyer | 198/860.5 X |
| 3,993,184 | 11/1976 | Campbell | 198/533 |

FOREIGN PATENT DOCUMENTS

| | | | |
|---|---|---|---|
| 256070 | 7/1964 | Australia . | |
| 593606 | 3/1960 | Canada | 198/860.1 |
| 1051538 | 12/1966 | United Kingdom | 198/860.1 |

OTHER PUBLICATIONS

Cambelt International Corporation, CamSpan, "Fully Enclosed Modular Troughing Belt Conveyors," 1976, 6 pages.
Cambelt International Corporation, CamSpan, 1981, 8 pages.
Cambelt International Corporation, CamSpan Gallery, 1981, 6 pages.
Cambelt International Corporation, "Terminal Nears Completion," CamNews, Spring 1984, 4 pages.

The Young Industries, Inc., "Aero Mechanical Conveyor," Bulletin 255-100, 4 pages.
Entecon Limited, "Aero Mechanical Conveyor Systems", 4 pages.
Cambelt International Corporation, CamBelt, "Enclosed Belt Conveyors ... Material Handling Systems", 8 pages.
Omnilift, "Omni-Lift Moves Mountains", 1 page.
Omni-Lift, "Mobiloaders and Rail Car Unloaders", 4 pages.
CIM Bulletin, May 1984, 1 page.

*Primary Examiner*—Thomas F. Callaghan
*Attorney, Agent, or Firm*—Workman, Nydegger & Jensen

[57] ABSTRACT

A system for covering and supporting a conveyor belt system. The conveyor belt system is supported in large measure by a structural support tube. The structural support tube is simply a tube or pipe of the conventional type. Disposed through the center of the tube are a plurality of internal support pipes. In turn, auxiliary support pipes, smaller in diameter than the internal support pipes, may traverse the interior of the internal support pipe and extend out either end. Attached to the auxiliary support pipes is a conventional belt conveyor system. The belt conveyor system is, in turn, enclosed by a top cover and a lower enclosure. All of the parts are held securely together using readily available materials such as angle iron. The present invention is extremely flexible providing the capability of easily constructing 40, 60, 80 and 120 foot spans of conveyor system. In addition, it is possible to provide an open conveyor, a partially enclosed conveyor, or a totally enclosed conveyor. The parts used in the device are interchangeable, conventional, and are easily shipped and assembled.

5 Claims, 6 Drawing Figures

APPARATUS FOR SUPPORTING AND ENCLOSING CONVEYOR SYSTEMS

BACKGROUND

1. The Field of the Invention

This invention is generally related to conveyor belt structures. In particular, the invention is related to an apparatus for enclosing and supporting belt conveyor systems.

2. Background of the Invention

Conveyor belts are widely used for moving various types of material from one location to another. In its simplest form, a conveyor belt is comprised of a flat belt secured end to end so as to form an elongated loop. This loop of belting is then passed around a pair of rollers located at either end of the elongated loop of belting. Intermediate between the ends of the loop may be disposed supporting rollers, plates, or similar support structures. The belt is then caused to rotate by an attached motor or other power source. Thus, material may be placed upon the belt at one end and carried to the opposite end of the belt, where it is either removed or caused to fall from the belt as the belt carrying the material passes around the end roller and begins its return to its original position.

Certain slightly more complex configurations of the traditional conveyor have also been developed. One such configuration is the formation of a trough on the upper surface of the belt which carries material. This may be done by using a flexible belt which rests on a plurality of rollers disposed in a generally semicircular configuration to form a trough.

One fairly typical type of trough conveyor employs a central roller which lies in a generally horizontal plane. On either side of the central roller are side rollers which are disposed at an approximately 35° angle above the horizontal plane. The flexible belt then rests on the upper surfaces of the three rollers. This causes the belt to form a trough as generally described above. As the belt returns to its original position it generally passes under the rollers forming the trough and simply rests on a return idler which lies in a generally horizontal plane below the trough.

This type of roller and belt configuration is particularly useful when conveying particulate bulk materials. It will be appreciated that such a belt configuration keeps such materials confined on the belt surface. In addition, such systems are flexible in design so that specifically configured troughs may be formed for specific types of materials.

Conveyor belts of the type described above have received wide acceptance in the transportation of many types of materials. Such materials may include packages and large containers which may be transported on a simple flat belt system. As discussed above, other materials such as particulate materials may be conveyed on a belt generally forming a trough configuration. Such materials may vary from powders to large aggregate materials. Materials which are conventionally conveyed by conveyor belts include coal and other mining products, gravel, cement, chemical feedstocks and food products (including grains and the like).

Some obvious problems develop when using conveyor belts to convey particulate materials of the type described above. For example, if the conveyor belt runs out-of-doors, it is difficult to protect the conveyed material from the elements. A significant loss of material may result from wind blowing across the surface of the conveyor belt. In addition, the elements, including rain and snow, may damage or destroy certain products as those products are moved on the conveyor.

With the advent of strict air quality standards, it also becomes necessary for industrial plants of all types to be concerned about particulate pollutants in the atmosphere adjacent the plant. Traditionally, one major source of particulate pollutants has been exposed conveyor belts carrying particulate material. For example, electric power plants generally move coal by conveyor to supply coal fire furnaces. However, wind blowing across an open conveyor could cause serious air pollution problems by causing coal dust to enter the air. As a result, the Environment Protection Agency and various related state agencies now generally require that particulates being moved along a conveyor system be contained or covered in some manner.

In order to solve the problems which have been encountered in the use of open conveyors, various systems have been devised to cover some or all of the conveyor. In particular, two general kinds of enclosures have been developed. These include partial enclosures and total enclosures.

Generally, a partial conveyor enclosure comprises some apparatus for shielding the conveyor from rain and snow. Such partial enclosures generally include a cover over the top of the conveyor. In the case of partial enclosures, however, the sides of the conveyor are left exposed to the elements.

As a result of the open sides of partially enclosed conveyor systems, these systems are not particularly satisfactory for use in conveying fine particulate material. As briefly discussed above, such material can be carried away by wind blowing across the top of the conveyor surface. As a result, these systems are generally inadequate for the purpose of controlling particulate pollutants.

The second type of conveyor enclosure is a total enclosure where, in essence, a structure is constructed which totally surrounds the belt conveyor system. Typically, such total enclosures are constructed of high quality steel molded into a generally circular tube. The conveyor belt is then disposed within and totally surrounded by the tube.

Several problems have developed in the use of such conventional total conveyor enclosures. One problem is that it is extremely difficult to service the interior of such a conveyor system. Obviously, when the conveyor is totally enclosed in a tube, problems in servicing the conveyor are acute because of the limited access to the interior of the tube.

Another severe problem with total enclosures is that they are extremely expensive. Such enclosures are expensive to manufacture in that they require the use of expensive materials and expensive fabrication techniques. In particular, fabrication of conventional conveyor enclosures is extremely labor intensive. For example, it is not uncommon for fabrication of a forty foot section of such a conveyor to consume significantly more than sixty-five man hours. In addition, total enclosures are difficult to ship. They are generally extremely large and bulky and as a result, generally only a limited length of such conveyor enclosure can be shipped on a single semitrailer or railroad car. It is also difficult to stack multiple lengths of such an enclosure for shipping.

A further problem with conventional conveyor systems is that they have a limited span. In order to span large distances, it is necessary to construct expensive and complicated support mechanisms. Such support mechanisms make large spans of such conveyor systems extremely expensive.

Hence, what is needed in the art are methods and apparatus for partially or totally enclosing conveyor belts which overcome the problems discussed above. In particular, it would be a significant advancement in the art if a conveyor system were produced which was easily manufactured, preferably employing conventional and readily available parts and materials. It would also be an advancement in the art if such apparatus could be produced which was inexpensive to ship and was capable of being shipped while stacked on pallets, or in the same manner as conventional piping. It would also be an advancement in the art if such a system could be produced which was easy and inexpensive to assemble. Furthermore, it would be an advancement in the art if such a conveyor system could be produced which allowed the conveyor to be totally enclosed, yet was easy to access and service. It would be a further advancement in the art if such a conveyor system could be produced which was capable of being placed into long spans using conventional and inexpensive technology and equipment. Such methods and apparatus are disclosed and claimed herein.

BRIEF SUMMARY AND OBJECTS OF THE INVENTION

The present invention is related to an apparatus for enclosing and supporting belt conveyor systems. Furthermore, the present invention is related to an apparatus which is simple and inexpensive to construct, ship, and assemble on the site. The present invention also makes it easy to service the belt which is enclosed within the enclosure.

Essentially, the present invention relates to supporting a belt conveyor system on a length of conventional pipe or tube. While it will be appreciated that other support structures may also be used, it is anticipated that a pipe or tube will be advantageous in most settings. For example, such a tube may consist of a typical 24, 30, or 36 inch diameter, ¼ inch wall tube, which is typically available in 40 foot lengths. Such tubing is readily available in that it has many uses, and is easily and inexpensively manufactured.

The present invention is constructed by placing a length of pipe across the interior diameter of the tube to form an internal support pipe. This pipe may be any type of pipe conventional in the art, such as 3 inch diameter pipe. Once the internal support pipe is in place across the diameter of the tube, an auxiliary support pipe may be inserted into the internal support pipe. The auxiliary support pipe is smaller in diameter than is the internal support pipe. The auxiliary support pipe then is employed in supporting the conveyor enclosure and related structures. While an extended internal support pipe may be used in place of the auxiliary support pipe, the use of the auxiliary support pipe will provide additional flexibility in use.

The conveyor, along with the conveyor enclosure, is positioned on top of the structural support tube. The conveyor and enclosure are secured in place by pieces of angle iron which are in turn attached to the auxiliary support pipe. All of these parts may be held in place by conventional welding techniques, or by bolts disposed between the various parts.

In order to enclose the conveyor as it rests upon the internal support tube, a top cover is placed over the conveyor. The top cover, in one embodiment of the invention, is generally semicircular in shape and large enough to fully enclose the conveyor as it rests on top of the structural support tube. The top cover may be fabricated of any type of conventional material such as a molded plastic material. This molded plastic top cover is attached to the remainder of the apparatus by a hinge. Thus, the top cover may be lifted off the conveyor in reasonably small sections so that the conveyor may be serviced as necessary. When the necessary service is complete the top cover is simply rotated back to its original position.

The final structural feature in order to fully enclose the conveyor is a lower enclosure disposed between the structural support tube and the conveyor. The lower enclosure is configured such that, in combination with the top cover, the conveyor can be totally enclosed. In the event it is desirable to only partially enclose the conveyor, the top cover or lower enclosure could possibly be removed or modified as needed to accommodate particular needs.

As a result, it is a general object of the present invention to provide methods and apparatus for inexpensively and easily manufacturing a support structure and enclosure system for a belt conveyor.

Further, it is an object of the present invention to provide such a support structure and enclosure system which employs conventional materials which are readily available in the industry.

It is also an object of the present invention to provide such a support structure and enclosure system which is easily shipped using conventional shipping techniques and which is easily assembled on the site.

It is another object of the present invention to provide such a support structure and enclosure system which provides for easy access and service of the belt conveyor used in connection with the system.

It is an additional object of the present invention to provide such a support structure and enclosure system which may be used in long spans employing conventional, simple techniques for spanning distances.

These and other objects of the present invention will become apparent upon reading the following detailed description and appended claims, and upon reference to the accompanying drawings.

DETAILED DESCRIPTION OF THE PREFERRED EMBODIMENTS

Figure 1:
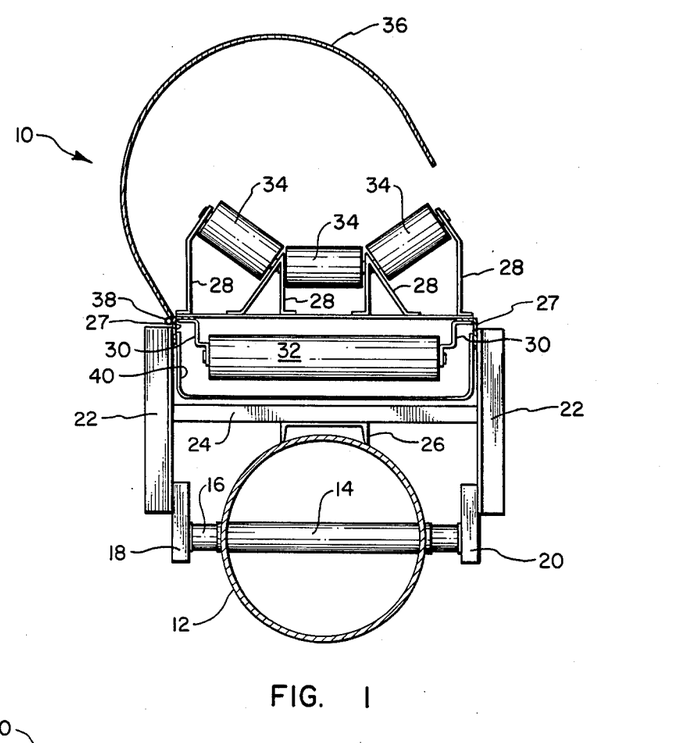
FIG. 1 is a transverse cross-sectional view of one embodiment of the apparatus of the present invention.

The present invention can be best understood by reference to the drawings, wherein like parts are designated with like numerals throughout. Referring more particularly to FIG. 1, a first embodiment within the scope of the present invention is illustrated. As mentioned above, the present invention is related to an apparatus for supporting and enclosing belt conveyor systems. In particular, the present invention is related to such an apparatus which employs inexpensive and readily available materials, including conventional 40 foot lengths of tubing, in order to support and cover a belt conveyor system. In addition to the use of readily available materials, the apparatus may be shipped and assembled on site very simply and inexpensively. At the same time, the present invention provides the benefits of more elaborate and expensive enclosure and support systems.

FIG. 1 is a transverse cross-sectional view of one embodiment of the present invention. The basic structural features of the present invention can be fully appreciated by reference to FIG. 1. The apparatus is generally designated with the numeral 10 in FIG. 1.

One important structural feature of the present invention is that the entire apparatus may be supported using a conventional structural support tube 12. Structural support tube 12 may be comprised of conventional pipe or tubing which is easily obtainable in the market. The size and specifications of the tube may vary depending on the specific uses of the conveyor system. It is presently anticipated, however, that structural support tube 12 may vary in size from approximately 24 inches in diameter to approximately 36 inches in diameter. In addition, such tubing is generally available in 40 foot lengths, a size which is easily adaptable to most belt conveyor systems.

Disposed within the center of and spanning the diameter of structural support tube 12 is internal support pipe 14. In the embodiment of the invention shown in FIG. 1, the length of internal support pipe 14 is approximately equal in diameter to the diameter of structural support tube 12. It will be appreciated, however, that internal support pipe 14 may protrude slightly from the interior of structural support tube 12 on each side, and indeed may replace auxiliary support pipe 16 in some circumstances.

Internal support pipe 14 may be formed of conventional pipe available in the marketplace. For example, a 3 inch diameter steel pipe may be found to be acceptable for most uses. Internal support pipe 14 may be positioned in place within the interior of structural support tube 12 by welding or by other conventional attachment techniques.

For many purposes it will be advantageous to dispose auxiliary support pipe 16 within the center of internal support pipe 14. Auxiliary support pipe 16 is used in order to support and stabilize in the lateral directions the various other components of the apparatus 10. As can be appreciated with reference to FIG. 1, auxiliary support pipe 16 may simply be slid in place through the interior of internal support pipe 14. Auxiliary support pipe 16 will be cut in appropriate lengths for the purposes described further below. Auxiliary support pipe 16 may be formed of any conventional material and may, for example, be formed of 2½ inch diameter steel pipe.

Auxiliary support pipe 16 is in turn securely seated within the interior of end piece 18. End piece 18 may be formed of any appropriate material such as channel iron which has been shaped, cut, or modified as desired. Auxiliary support pipe 16 may be attached to end piece 18 by any conventional attachment means such as by bolting or welding the two pieces together.

On the opposite end of auxiliary support pipe 16 from end piece 18, auxiliary support pipe 16 is seated within auxiliary support bracket 20. Auxiliary bracket 20 may be formed in a similar manner as end piece 18. However, as will be fully appreciated with reference to the discussion of the alternative embodiments of the present invention, auxiliary support bracket 20 may have an opening disposed through its center through which auxiliary support pipe 16 may pass.

End piece 18 and auxiliary support bracket 20 are in turn securely attached to struts 22. Struts 22 may be formed of any type of conventional and acceptable material. One such material is conventional angle iron. For example, angle iron having the dimensions 3 inches by 3 inches by ¼ inch is acceptable for many purposes such as those described herein. As will be appreciated more fully by reference to the discussion below, struts 22 securely connect the conveyor and the conveyor cover to the structural support tube 12.

Struts 22 are in turn connected to one another at approximately the mid point in their length by brace 24. Like struts 22, brace 24 may be constructed of conventional angle iron. For example, angle iron having the dimensions 2 inches by 2 inches by ¼ inch will be acceptable in many circumstances for the purposes of constructing brace 24.

Brace 24 is in turn placed in communication with structural support tube 12 by means of a support bracket 26. Again support bracket 26 may be formed of any type of available and suitable material. For example, support bracket 26 may be formed out of channel iron which is cut to the configuration illustrated in FIG. 1. As a result, struts 22 are supported by structural support tube 12 at their connections with auxiliary support pipe 16 and also by brace 24, by way of support bracket 26. Thus, through the use of support bracket 26 on struts 22, the conveyor system may rest on and be fully supported by structural support tube 12.

Attached to the upper ends of struts 22 is a horizontal truss 27 attached to each strut 22. In turn, attached directly to the trusses 27 is a conventional belt conveyor system. Specifically, roller supports 28 and return idler supports 30 are attached directly to the trusses 27. These parts may be attached in any conventional means such as by the use of bolts, welding or other conventional attachment techniques.

As illustrated in FIG. 1, a return idler 32 is suspended by return idler supports 30 from the trusses 27. As will be discussed in more detail below, the conveyor belt rests on return idler 32 as it returns to its initial position along the apparatus.

For some purposes it is useful to form a trough for the conveyor belt in order to allow it to carry particulate material. This trough functions to control and contain such material. As illustrated in FIG. 1, such a trough may be formed by the use of three separate carrier idlers 34. Carrier idlers 34 of this general type are standard and well-known in the trade. Specifically, the center idler 34 is disposed within the conveyor system in a generally horizontal position. The carrier idlers 34 on either end of the center carrier idler 34 are rotated upwardly at approximately a 35° angle. The angle of upward rotation may vary greatly depending on the expected use of the conveyor system. Thus, a flexible conveyor belt (not shown) will rest on top of carrier idlers 34 in such a manner as to form a trough. This trough can then contain particulate material which is carried by the conveyor system 10.

As discussed above, one of the primary objects of the present invention is to provide a simple method of enclosing such a belt conveyor system. As illustrated in FIG. 1, this is partially accomplished by positioning top cover 36 over the top of the conveyor system, including carrier idlers 34 and return idler 32. It can be appreciated with reference to FIG. 1, top cover 36 may be configured in a generally semicircular fashion. Thus, top cover 36 may totally cover the top of the belt conveyor system.

Top cover 36 may be made of any desirable and acceptable material. One such material is a molded plastic material. Such a material is inexpensive to manufacture and easy to assemble because of its light weight. In addition, problems such as corrosion and the like are avoided by using such plastic materials. It will be appreciated, however, that other conventional materials, such as sheet metals of various types may be used in particular applications.

As can be appreciated with reference to FIG. 1, top cover 36 may be easily moved in order to allow for servicing of the belt conveyor system. This is done by simply attaching top cover 36 to the remainder of the apparatus 10 by means of a hinge 38. Hinge 38 is in turn attached to truss 27. By attaching top cover 36 to the remainder to apparatus 10 by means of hinge 38 it is possible to lift the cover off of the top of the belt conveyor system, perform the required maintenance, and then simply replace the cover. This is further facilitated by the fact that top cover 36 will preferably be made of a light and flexible material.

In order to fully enclose the belt conveyor system, it is necessary to place a further structure beneath the belt conveyor system. As illustrated in FIG. 1, this is accomplished through the use of a lower enclosure 40. Lower enclosure 40 may be formed in a similar fashion as top cover 36. That is, lower enclosure 40 may be formed of a light plastic material or any other similar type of material. Lower enclosure 40 is configured such that it encloses the area generally beneath return idler 32 and between trusses 27 and in combination with top cover 36 totally encloses the belt conveyor. Lower enclosure 40 may be attached to remainder of apparatus 10 by simply bolting it to trusses 27 or by otherwise attaching it to the remainder of the device by any conventional means.

The method of assembly of the apparatus disclosed in FIG. 1 is easily understood. In order to assemble the apparatus, structural support tube 12, together with internal support pipe 14, is simply placed in its desired position. When this is accomplished, auxiliary support pipe 16 may be inserted within the interior of internal support pipe 14. Auxiliary support pipe 16 is then securely attached to end piece 18 on one end and either run through the interior of, or attached to, auxiliary support bracket 20 on the opposite end. As described above, end piece 18 and auxiliary support bracket 20 are then secured to struts 22, or in the alternative, struts 22 may be connected to end piece 18 and auxiliary support bracket 20 in advance of assembly by a permanent attachment technique, such as welding. Likewise, brace 24 can be connected to struts 22 at the time of assembly or may be welded to struts 22 in advance as can trusses 27.

The support bracket 26 may be placed in place on brace 24 by one or more bolts or by any other appropriate means of attachment. Further, it is anticipated that it may be desirable to weld bracket 26 in place on structural support tube 12 prior to the assembly procedure. At this point in the assembly, it is possible to simply place the belt conveyor system on the top of structural support tube 12 and trusses 27. This portion of the assembly simply involves bolting lower enclosure 40 and top cover 36, through hinge 38, to the trusses 27. In addition, return idler supports 30 and roller supports 28 may be bolted into place or attached in other conventional manner. Thus, it will be appreciated that apparatus 10 is easy to assemble and will conserve on the number of man hours required to place the device into service.

Once the assembly is complete, the user will be provided with a usable belt conveyor system which is totally enclosed. Thus, loss of material due to weather and wind will be avoided, as will the emission of particulate pollutants. At the same time the belt conveyor is easily accessible because top cover 36 can be easily lifted off the belt conveyor during service, and then easily replaced.

It will be appreciated that the materials used to construct the apparatus 10 disclosed in FIG. 1 are easily obtainable. Thus, it is possible for a manufacturer or user to stock all of the necessary parts and to replace worn or damaged parts. Likewise, each of the components of the apparatus 10 is easily shipped. For example, top cover 36 is easily nested with other top covers which are similar in shape and size. Thus, these covers may be shipped without assuming excess space. Similarly, the various pieces of angle iron and pipe can be shipped easily using conventional shipping techniques. Structural support tube 12 can also be shipped using conventional shipping techniques even with internal support pipe 14 disposed within the center of structural support tube 12. Thus, it will be appreciated that the shipping costs for apparatus 10 are greatly reduced over that encountered in presently available conveyor enclosure systems.

Figure 2:
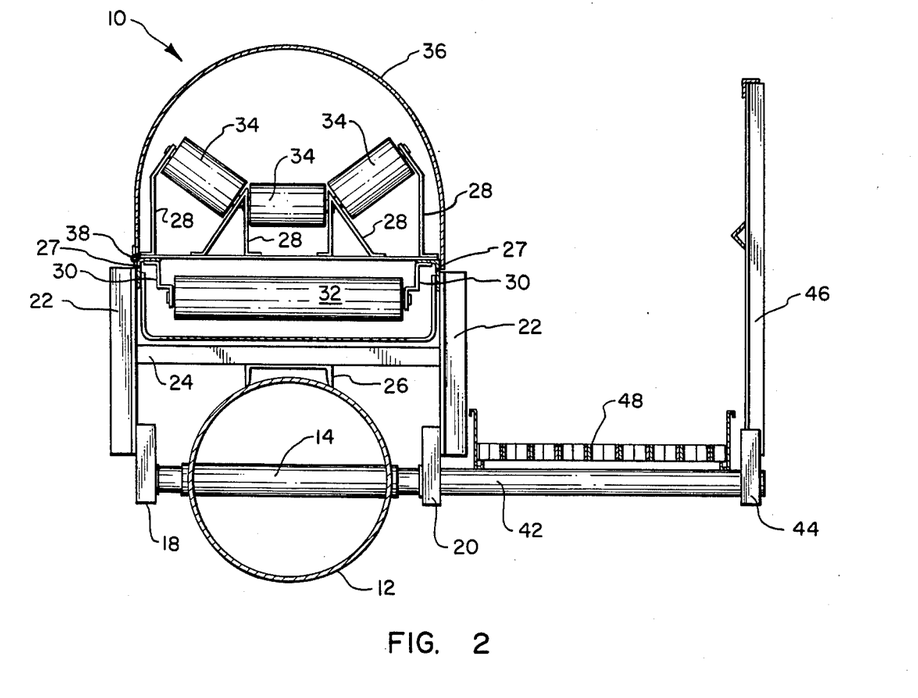
FIG. 2 is a transverse cross-sectional view of an embodiment of the present invention having a walkway.

The flexibility of apparatus 10 can be further appreciated with reference to FIG. 2. In FIG. 2 an alternative embodiment of the apparatus shown in FIG. 1 is disclosed. However, a more elongated auxiliary support pipe 42 is illustrated. The elongated auxiliary support pipe 42 allows additional auxiliary structures to be easily attached to apparatus 10. As illustrated in FIG. 2, a walkway and handrailing are added to the apparatus. In particular, elongated auxiliary support pipe 42 extends through the center of auxiliary support bracket 20 and is seated in walkway end piece 44. Securely attached to walkway end piece is a post 46. Post 46, in turn, forms the basis for the construction of a handrailing along the outer edge of the walkway. In addition, conventional grating 48, or the like, may be laid on the top of a series of elongated auxiliary support pipes 42 in order to form the walkway.

Figure 3:
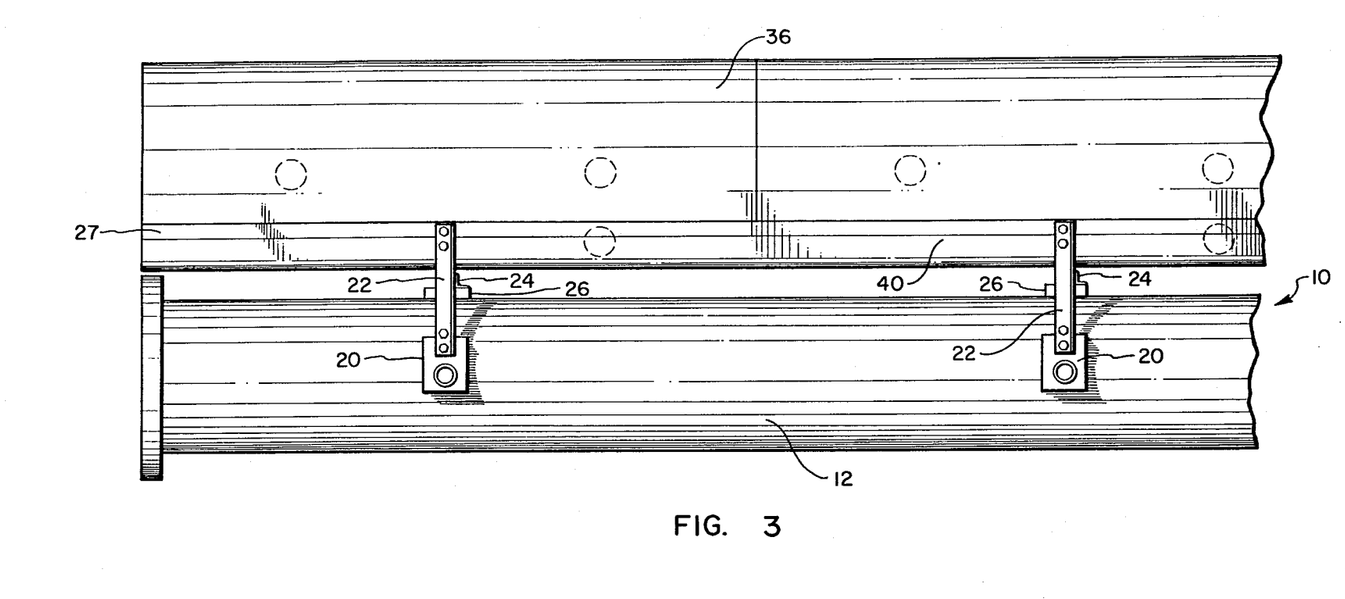
FIG. 3 is a side elevational view of the exterior of one embodiment of the present invention.

The configuration of apparatus 10 can be further appreciated with reference to FIG. 3. FIG. 3 is a side elevational view of a section of apparatus 10 showing the repeating nature of the structure illustrated in FIG. 1. Specifically, structural support tube 12 is illustrated in FIG. 3. The remainder of the apparatus 10 is attached to structural support tube 12 as described above. Also illustrated in FIG. 3 are auxiliary support brackets 20 and struts 22. Struts 22 are shown connecting the auxiliary support bracket 20 to the top cover 36 by way of trusses 27. Also illustrated is lower enclosure 40.

Figure 4:
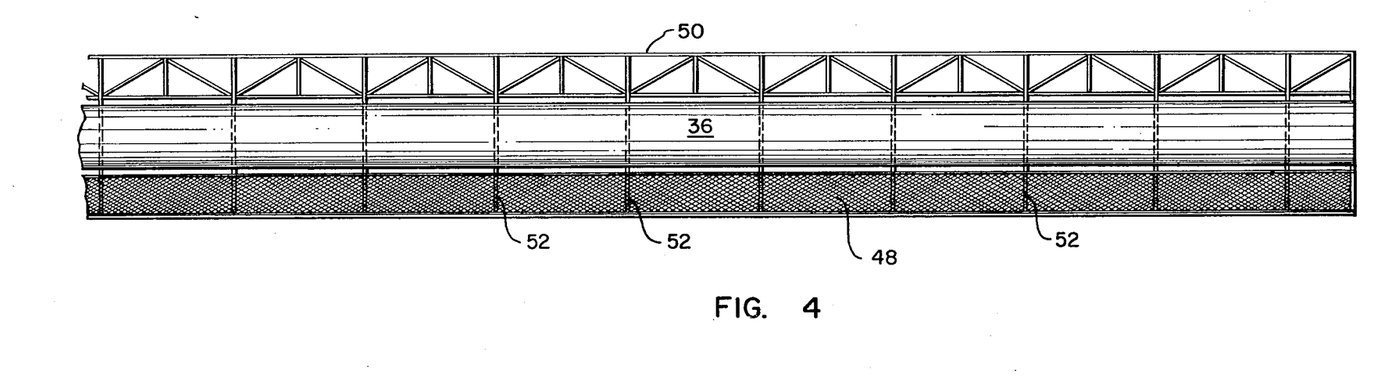
FIG. 4 is a top view of the present invention including a walkway and a side lattice bracing.

For some applications it may be necessary to further brace the apparatus 10 in the generally lateral direction. FIG. 4 illustrates one embodiment of the current invention having a lattice bracing along one side of the apparatus. FIG. 4 is essentially a top view showing the walkway on one side, as well as the grating 48 which forms the walkway. In the center is the top cover 36. On the opposite side of the device from the walkway is the lattice bracing 50. Lattice bracing 50 may take any desired configuration in order to accomplish the desired purposes. The embodiment illustrated in FIG. 4, however, is expected to be satisfactory for most uses. In order to construct the embodiment of the device shown in FIG. 4, it is simply necessary to extend the auxiliary support pipe through both sides of the apparatus 10. Thus, as illustrated in FIG. 4, auxiliary support pipe 52, which is similar to auxiliary support pipe 42 shown in FIG. 2 and auxiliary support pipe 16 shown in FIG. 1, supports the walkway, the internal structure of the apparatus 10, as well as the lattice bracing 50.

The lattice bracing can be added to the apparatus 10 using conventional and easily obtainable materials. In order to support the lattice bracing, an auxiliary support pipe 52 is simply chosen which is long enough to extend through both sides of the structural support tube 12. The lattice bracing can then be attached to auxiliary support pipe 52 by conventional means.

Figure 5:
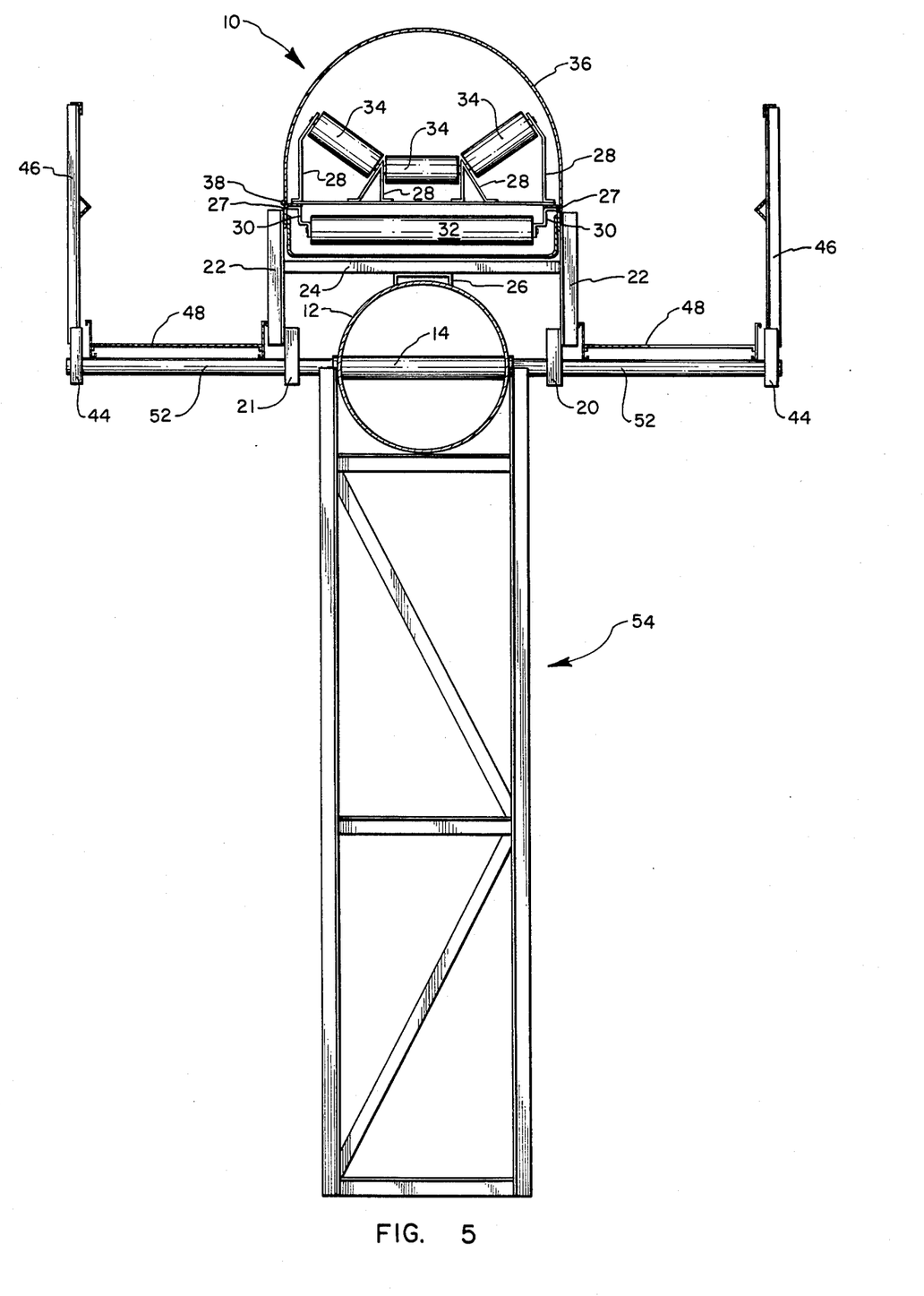
FIG. 5 is a transverse cross-sectional view of an embodiment of the present invention supported by a queens stand and having a walkway on both sides of the belt enclosure.

A slightly different embodiment of the apparatus 10 is illustrated in FIG. 5. In FIG. 5, auxiliary support pipe 52 extends through both sides of structural support tube 12. Auxiliary support pipe 52 extends through auxiliary support bracket 20 and auxiliary support bracket 21. As an alternative to placing the lattice bracing on the left side of the device as shown in FIG. 4, FIG. 5 illustrates walkways placed on both sides of apparatus 10. The walkways illustrated in FIG. 5 are essentially identical to the walkway illustrated in FIG. 2. They are comprised of grating 48 or some other type of support which in turn rests on the auxiliary support pipes 52. Extending upwardly from auxiliary support pipe 52 are posts 46. Posts 46, can in turn be used as the basis for constructing a handrail along the outer edge of the walkway.

Thus, it can be appreciated that apparatus 10 can be easily modified in order to construct walkways on both sides of the device. This can be done by simply modifying the length of auxiliary support pipe 52 and adding an additional auxiliary support bracket 21. Again, conventional and easily obtainable and interchangable parts and materials are used to construct the additional walkway.

As a further matter, FIG. 5 illustrates the apparatus being supported by a conventional support generally referred to as a "queens stand" 54. Queens stand 54 may be constructed of a plurality of iron pieces or other types of tubing or metal structures. This queens stand can be of any type generally used to support tubing or piping in the pipe laying industry.

Figure 6:
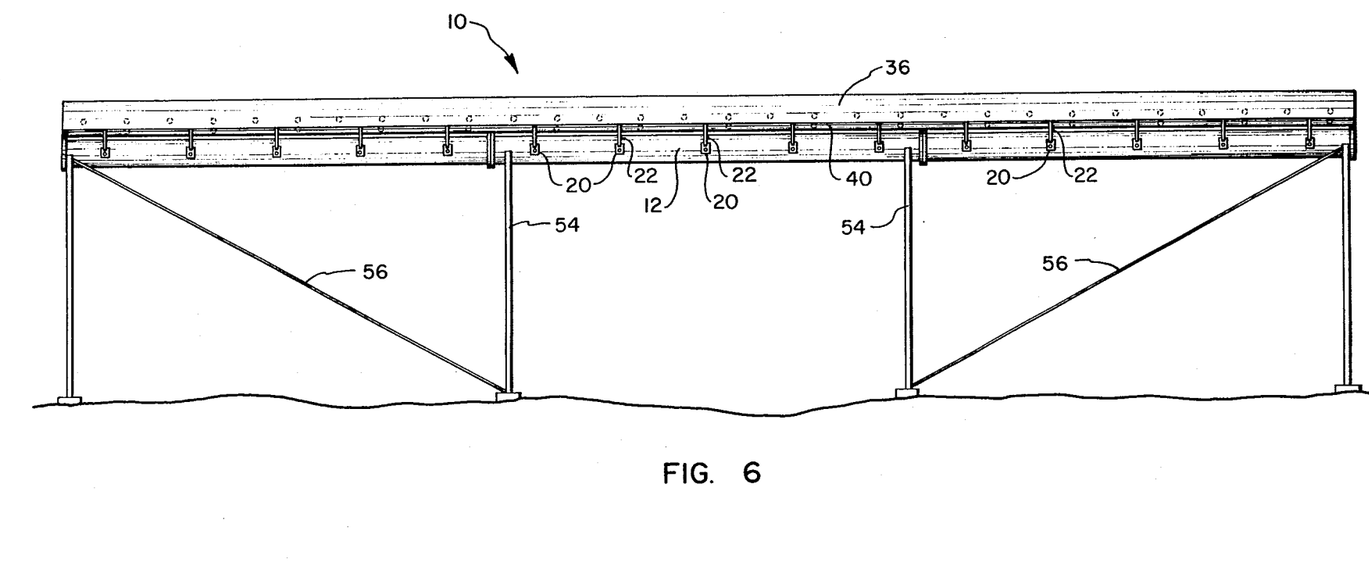
FIG. 6 is a side elevational view of an embodiment of the present invention resting on a queens stand assembly.

FIG. 6 illustrates in additional detail the formation of a typical queens stand. FIG. 6 illustrates three 40 foot lengths of structural support tube 12 linked together to form a single 120 foot span. The queens stand structures 54 are linked together by a steel rod 56 or other type of suitable linkage material. One type of steel rod which has been found to be acceptable and usable is a 1¼ inch diameter steel rod.

Thus, it will be appreciated that the present invention accomplishes the objects listed above. In particular, the present invention uses readily available materials. As a result, it is extremely flexible and will easily accommodate a series of different modifications. The present invention may be used to construct an open belt system, a partially enclosed belt system, or a fully enclosed belt system. These modifications can be made by modifying the configurations of the top cover 36 and lower enclosure 40.

The present invention can also accommodate all sizes of belt systems. For example, it is expected that the present invention will easily accommodate belts ranging in width from 18 to 48 inches.

Further, as illustrated in FIG. 5, the present invention can easily span up to 120 feet. This can be done by simply attaching the device to a queens stand. Likewise, spans of other lengths may be constructed depending on the characteristics of structure support tube 12.

Walkways may also be constructed on the apparatus as needed. In particular, FIG. 1 illustrates the device with no walkway, FIG. 2 illustrates the device having a walkway on one side, and FIG. 5 illustrates the device having a walkway on both sides of the device. At the same time, it is possible to add a lattice bracing on one or both sides of the device as illustrated in FIG. 4.

The walkway, handrailing and lattice bracing are all easily supported. Because of the fact that the parts are all easily interchangeable, the device can be modified and adapted to particular conditions. Furthermore, the design of the apparatus allows for use of galvanized material, rather than requiring that the material be painted.

Fabrication time is also greatly reduced as is engineering time. The device may be fabricated from conventional materials and easily adapted to particular situations. Thus, it is possible to maintain a computerized parts list to supply the apparatus. As a result, it can be appreciated that the present invention is a significant advancement in the art.

The present invention may be embodied in other specific forms without departing from its spirit or essential characteristics. The described embodiments are to be considered only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letter Patent is:

1. An apparatus for supporting and totally enclosing a belt conveyor system comprising:
   an elongated structural support tube;
   a plurality of internal support pipes disposed generally transversely within the interior of the elongated structural support tube such that when the apparatus is in operation the internal support pipes lie in the generally horizontal plane;
   a plurality of auxiliary support pipes disposed within the center of the internal support pipe;
   struts securely attached to each end of the auxiliary support pipes and extending generally upwardly;
   braces attached to each pair of struts at a point on said struts such that the braces are disposed above the structural support tube and are positioned generally parallel to the auxiliary support pipes;

support brackets securely attached to the underside of the braces and resting on the structural support tube;

trusses attached to the tops of said struts and running in a generally horizontal direction parallel to a belt conveyor system;

a belt conveyor system attached to said trusses and disposed above said braces;

a top cover attached to at least one truss and configured such that when in place it covers said belt conveyor system; and a lower enclosure attached to at least one truss and configured such that when in place it cooperates with the top cover to totally enclose said belt conveyor.

2. An apparatus as defined in claim 1 wherein said trusses, said struts, and said brace are formed of angle iron.

3. An apparatus as defined in claim 1 wherein said top cover is attached to said truss by a hinge which allows said top cover to pivot generally upwardly.

4. An apparatus as defined in claim 1 wherein said internal support pipes are approximately 3 inches in diameter.

5. An apparatus as defined in claim 1 wherein said auxiliary support pipes are approximately 2½ inches in diameter.

* * * * *